Figure 7:
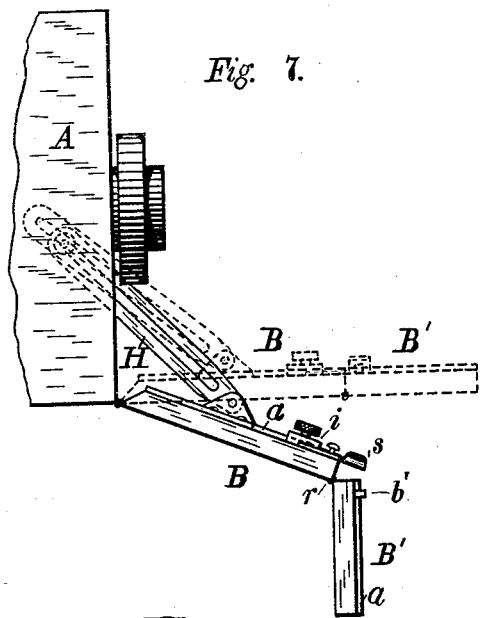
Figure 8:
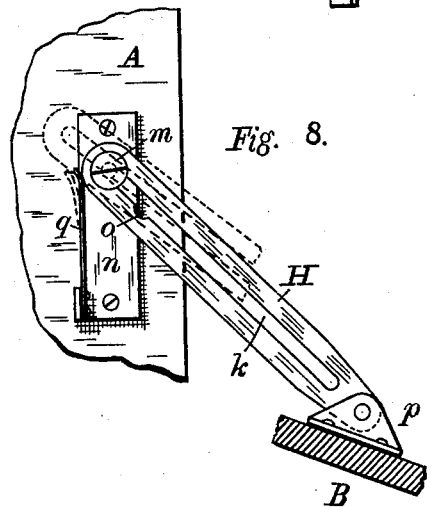

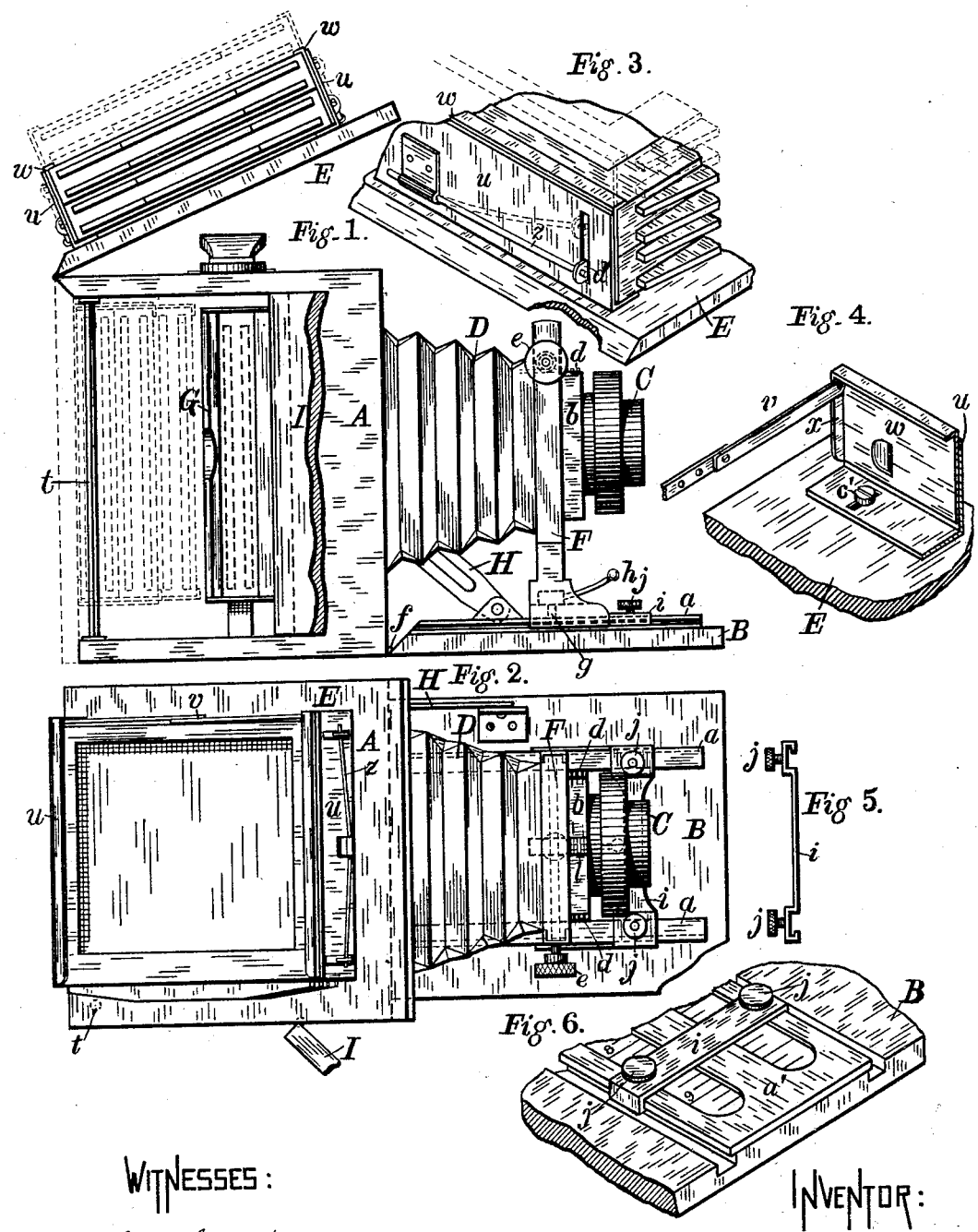

(No Model.) 2 Sheets—Sheet 2.
G. D. MILBURN.
PHOTOGRAPHIC CAMERA.

No. 558,089. Patented Apr. 14, 1896.

WITNESSES
G. S. Dey.
Charles F. Logan.

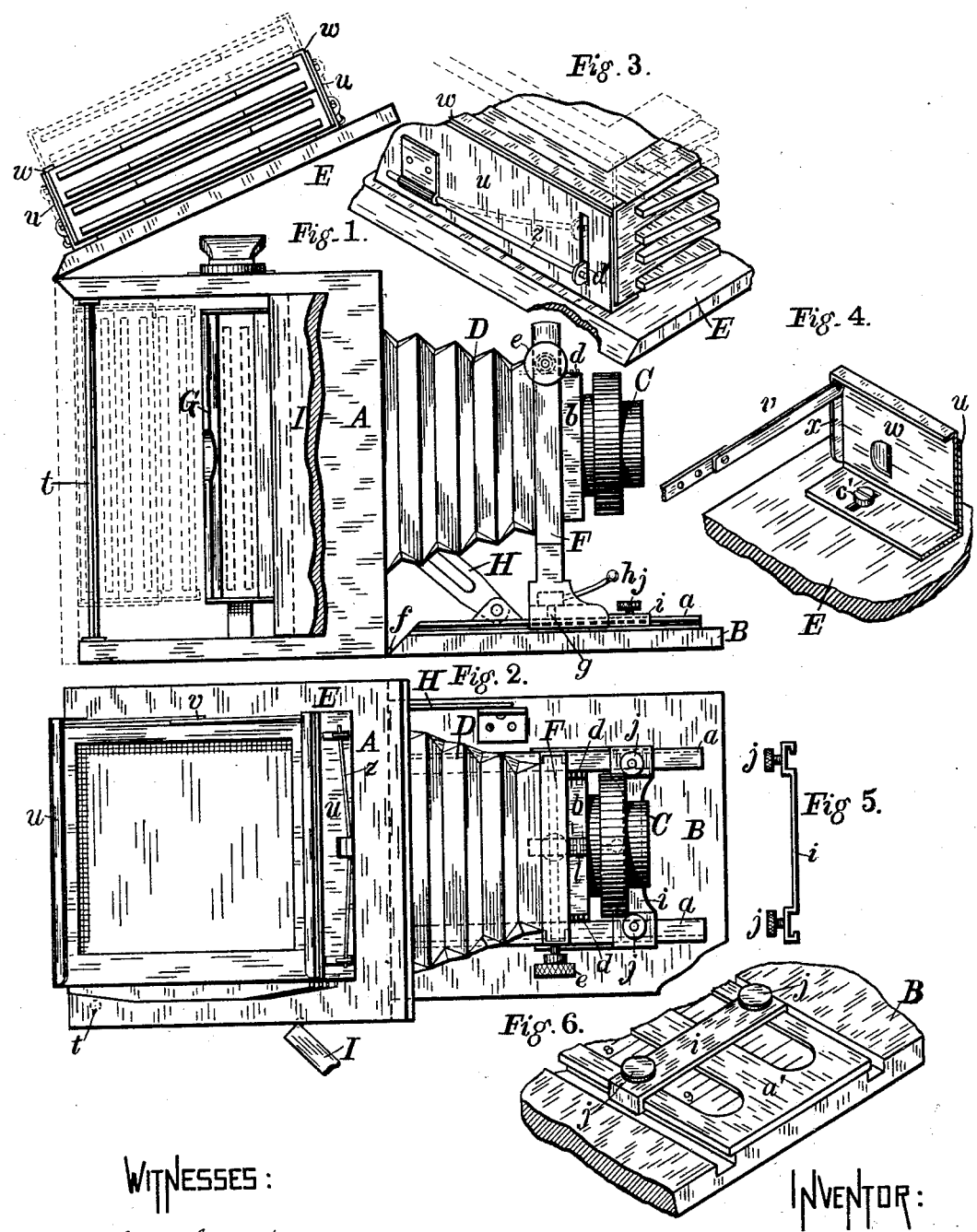

INVENTOR
G. D. Milburn,
By Geo. B. Selden,
atty.